Inventors
C. G. Richardson
J. W. Hogue
by
Geo N. Goddard, Attorney

June 15, 1937.  C. G. RICHARDSON ET AL  2,084,301
SEAM PROTECTING ATTACHMENT FOR CLOTH SHEARING MACHINES
Filed Feb. 9, 1932   4 Sheets-Sheet 4
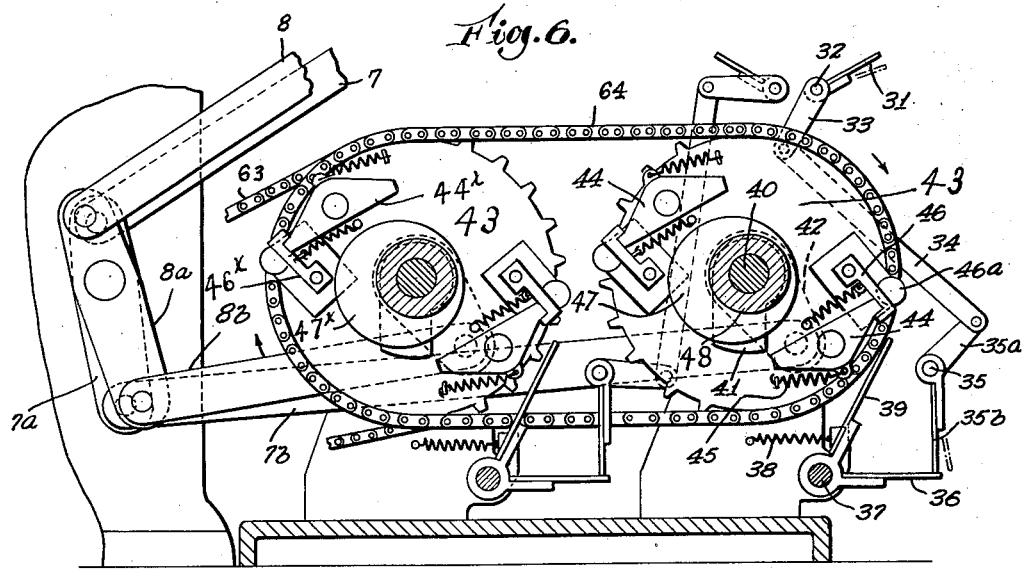
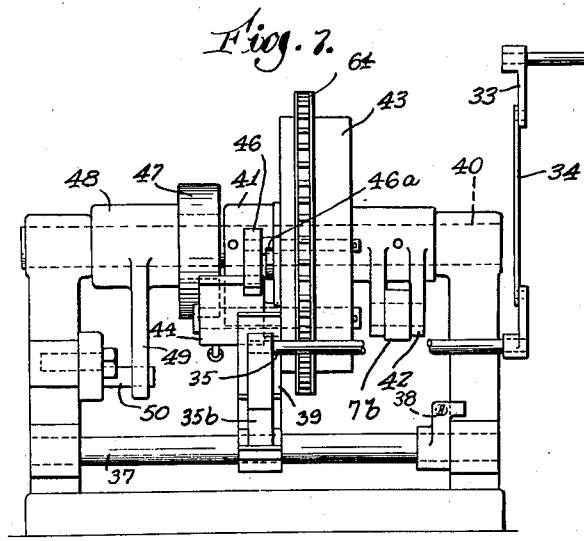
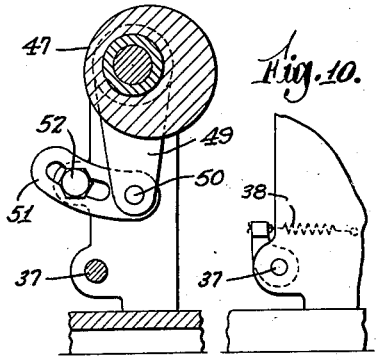
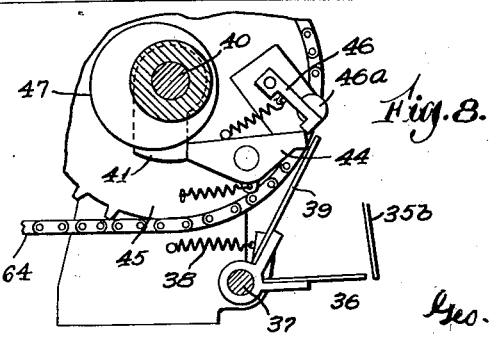
Inventors
C. G. Richardson
J. W. Hogue
by
Geo. N. Goddard, Attorney Patented June 15, 1937

2,084,301

UNITED STATES PATENT OFFICE 2,084,301

SEAM-PROTECTING ATTACHMENT FOR CLOTH SHEARING MACHINES

Charles G. Richardson and John W. Hogue, Springfield, Vt., assignors to Parks & Woolson Machine Company, Springfield, Vt., a corporation of Vermont Application February 9, 1932, Serial No. 591,830

18 Claims. (Cl. 26—17)

This invention relates to machines for shearing cloth which employ, for the purpose of cropping or shearing the cloth, coacting shearing elements embracing on the one hand a rotary fly blade and its companion ledger blade mounted in fixed relation in a movable supporting head or frame forming a shearing couple, and a cooperating associated cloth rest over which the cloth travels to present its nap or surface threads to the shearing action of the shear blades. Since, to avoid threading each piece sheared through the shearing machine separately, it is the custom to sew together end to end numerous pieces of cloth which are fed through the machine in a continuous strip, it is necessary to separate or open the shearing elements to permit the passage of the ends to prevent damaging the cloth and breakage of the shearing blades. This separation or opening of the shearing elements has been commonly effected either by moving the shearing head carrying the shear blades away from the cloth rest, or by moving the cloth rest away from the shearing blades as the seam approaches the shearing line.

This operation of opening or separating the shearing elements was long performed by hand operated levers at the front of the machine manipulated by the shear operator. It has long been proposed to effect the opening and closing of the shearing elements by automatic mechanism controlled or energized through the seam as the seam approaches the shearing line. While earlier attempts in this direction involved lifting of the blade head directly by means of the seam, yet the strain on the cloth being fed involved in this mode of operation was objectionable and it was then proposed to use a power driven mechanism on the shearing machine to do the work of moving the blade head or the cloth rest, as the case may be, which mechanism is energized or started in action by an easily operated device or feeler actuated by the seam.

Previous attempts to devise a practical and satisfactory automatic seam-controlled mechanism for opening and closing the shearing elements have encountered two serious difficulties due, chiefly, to the fact that there are usually found on the surface of cloth to be sheared numerous bunches, lumps, knots or the like which have sufficient thickness to engage and operate the feeler mechanism just as the seam is intended to operate it. Obviously, when such a lump or bunch occurs on the cloth only a short distance in advance of the seam, it will act by its engagement with the feeler to start the shear opening mechanism in action. Now, as these seam-energized mechanisms for opening and closing the shearing elements have always heretofore acted upon a complete cycle of operations, which once started must continue until the cycle is completed, it will be seen that when a bunch some distance in advance of a seam operates the feeler mechanism to energize the seam-protecting means, such as mechanism for opening and closing the shearing elements, the cycle of operations of such seam-controlled mechanism may be completed to close the shearing elements after a seam has passed the feeler mechanism and before it has reached the shearing elements. Consequently, when the approaching seam encounters the shearing elements in normal operative position the cloth is likely to be badly damaged and it often happens also that the shearing blades are broken when encountering this extra thickness.

With these difficulties in view we have devised the present improvement in seam-protecting mechanism which, in the form illustrated and described in this specification, acts to separate the shearing elements by raising the shear head as the seam approaches the shearing line but which, nevertheless, is obviously applicable to operate any type of seam-protecting means that will allow the seam to pass by the shearing line without injury to the cloth or harm to the blades.

The mechanism forming the subject of the present improvement operates on the same general principle as mechanism forming the subject matter of a companion application filed by us jointly February 9, 1932 Ser. No. 591,829 preparatory to filing the same in the United States Patent Office, but differs from the mechanism therein shown in many particulars beside introducing some new features in operation. These improvements will be described in detail in the following specification and will be defined in the claims hereto annexed.

In the accompanying drawings illustrating one form of mechanism embodying the principles of this invention, Fig. 1 is a side elevation of a double shearing machine showing only such parts of the mechanism as is necessary to an understanding of the present improvement.

Fig. 6 is a side elevation from the left side of the machine illustrating the construction of the two simultaneously driven elements that operate, respectively, the front and the rear blade heads of the shearing machine when energized through the action of the seam-controlled mechanism.

Fig. 7 is a front elevation showing the forward elements of the mechanism shown in Fig. 6 which operates the front shear head.

Fig. 8 is a detail view showing in side elevation the actuating pawl of the front element shown in Fig. 6 in its active operating position for rasing the blade head.

Fig. 9 and Fig. 10 are side elevations showing detailed parts of this element.

Figure 1:
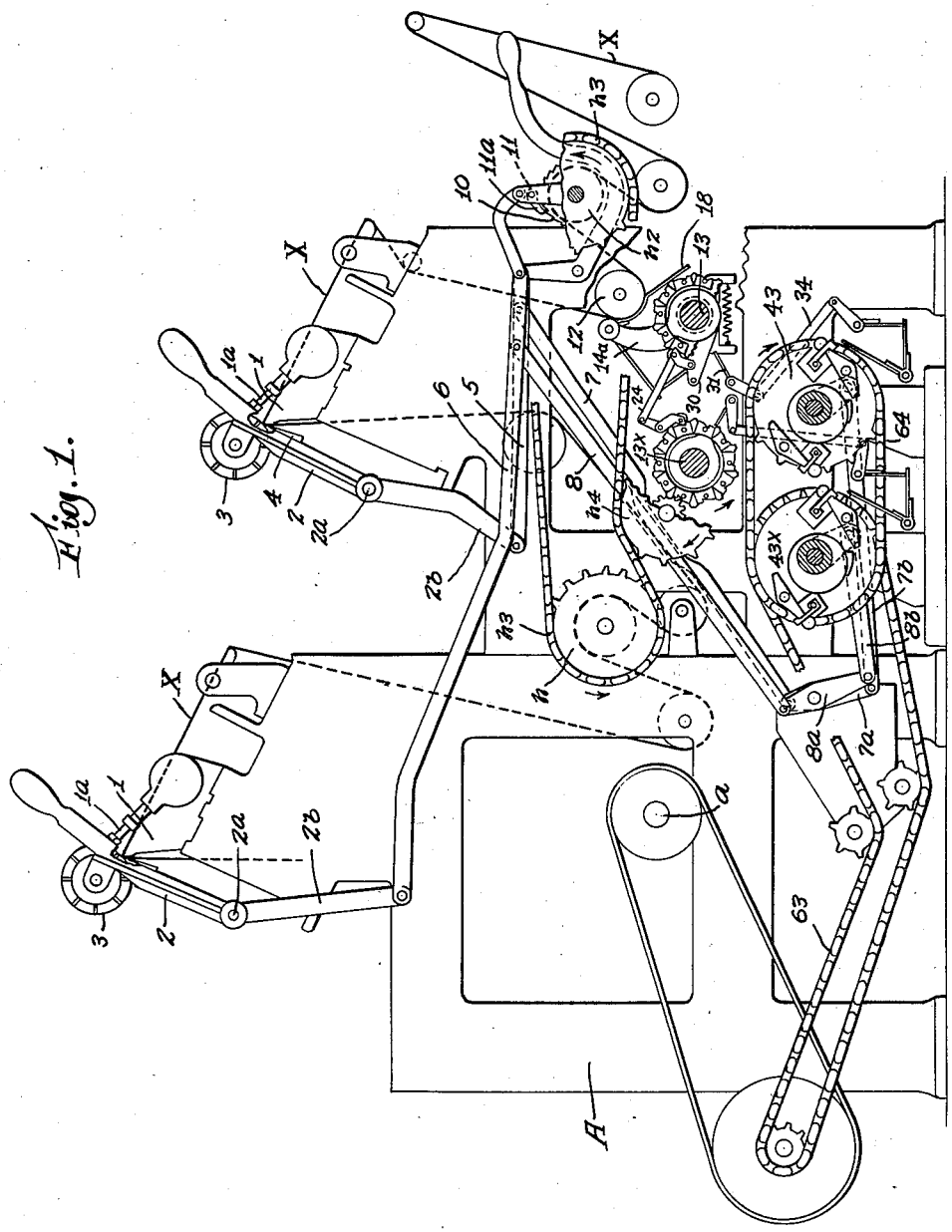

While the seam-controlled, seam-protecting mechanism is applicable to different forms and styles of shearing machines, whether single or multiple, we have shown in the drawings the application of this mechanism to a double shear having the general construction illustrated in Letters Patent of C. G. Richardson No. 1,152,048 dated August 31, 1915, which contains front and rear stationary cloth rests 1, over and around which the cloth is guided in its approach to the shearing line established at its edge by the front and rear rotary fly blades 3 and their associated ledger blades 4 mounted on a swinging supporting head or frame 2 pivotally mounted at 2$^a$ and having projecting downwardly from their pivotal axes arms 2$^b$ by which the respective blade frames or heads may be shifted away from their operative or active position to let the seam pass by, and by which they are returned to active position after the passage of the seam. Adjustable set screws 1$^a$ on a fixed part of the frame serve to limit the movement of the blade heads toward their respective cloth rests. The heads are sufficiently balanced to tend to return to normal active position of their own weight when the opening mechanism has been released to permit such return movement.

The view shown in Fig. 1 is a left side elevation with the front or cloth entering end of the machine at the right. The course of the cloth through the machine to, and beyond the respective shearing elements, is shown in this figure. The cloth after passing around forwardly arranged guide rolls passes around the front draft roll $h^2$, thence around a freely rotatable roll 12 and upward to and over the cloth rest, then around other guide rolls to and around a rearward draft roll $h$, whence it passes over suitable guides to the rear cloth rest for cropping by the rearward shearing blades.

Figure 4:
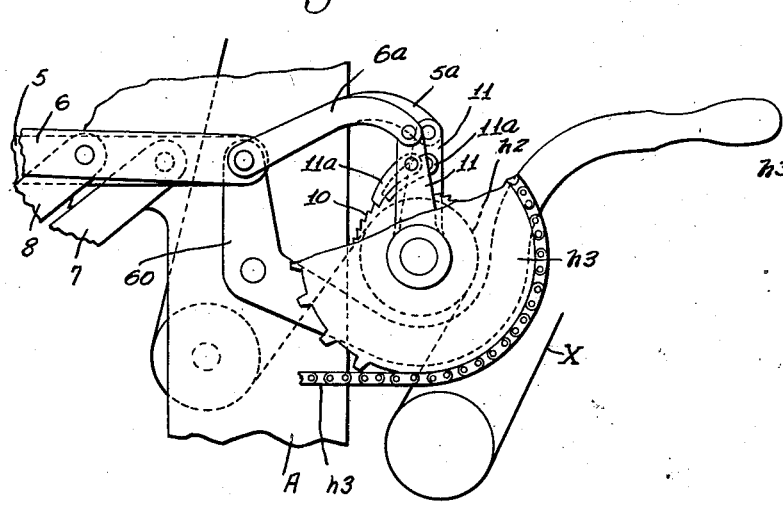
Fig. 4 and Fig. 5 are, respectively, side and front elevations of the manual control and also of the checking means which retards, respectively, the return of the front and of the back blade heads to operative position in order to eliminate objectionable shock or jar.
Figure 5:
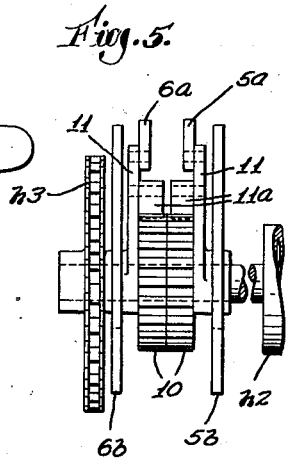

Movement of the forward shearing head is effected through a link 5, which at its forward end is connected by a link 5$^a$ with a pawl arm 11 which carries a pivotal pawl 11$^a$ engaging the teeth of a ratchet wheel 10 fast on the forward feed or draft roll $h^2$. The link 6 for moving the rear blade head has a similar connecting link 6$^a$ attached to a separate ratchet arm 11 carrying a pawl 11$^a$ engaging a similar ratchet fast on the shaft of this draft roll exactly similar to the one just described as best illustrated in Fig. 4 and Fig. 5. The object of this ratchet and pawl movement is to retard the return of the respective blade heads to active position so as to eliminate objectionable shock when they engage their respective stop screws. The pawls can ride backward in a clockwise direction over their respective ratchets when the shearing elements are opened or separated, but when freed from driven connection with their actuating elements each return movement is checked by engagement between its connected pawl arm with its slowly rotating ratchet.

Links 5 and 6 are connected, respectively, by links 7 and 8 with rocker arms 7$^a$ and 8$^a$, which are actuated respectively at different times by links 7$^b$ and 8$^b$ whose forward ends are pivotally connected with arms forming part of respective actuating elements which are energized through feeler actuated mechanism, which will now be described.

It will be understood that in this case we have shown each pair of the shearing elements separately controlled and timed as to their opening and closing movements but dependent upon a common feeler means for starting the separate actuating elements in operation. Moreover, it should be understood that the feeler device, having acted momentarily by the passage of the seam to energize the shear opening and controlling elements, returns immediately to normal position after having energized the control mechanism for the respective shears. It will also be understood that the seam-responsive elements after momentary action are capable of repeating their action an indefinite number of times before the normal closing of the shearing elements if a succession of lumps or bunches should cause a series of operations at brief intervals apart, so that the shearing elements will not return to active position as long as such a succession of operations of the shearing elements is effected by the feeler device.

Figure 2:
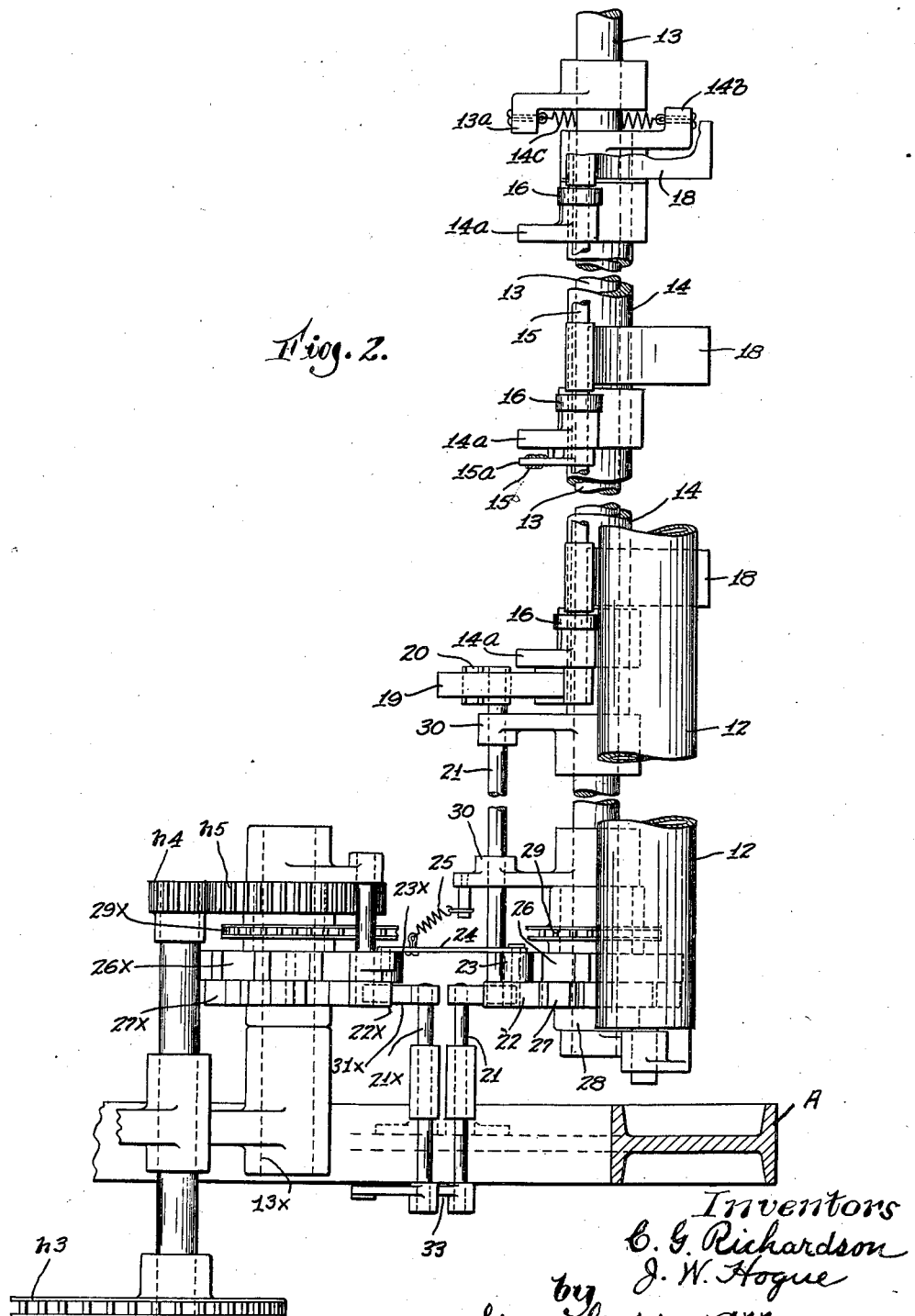
Fig. 2 is a plan view showing the seam-controlled mechanism and its operative or energizing connection with that part of the mechanism that controls the opening and the closing of the shear elements.
Figure 3:
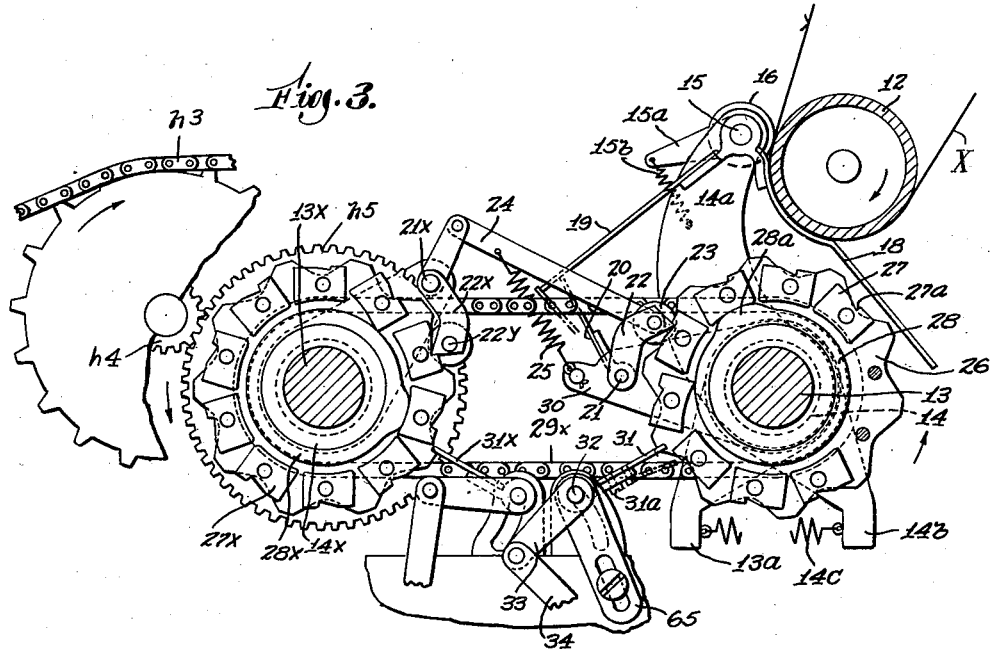
Fig. 3 is an enlarged detail view showing in side elevation the seam-controlled portion of the mechanism that energizes the mechanical movement or mechanism that opens the front and rear shearing elements in succession and, after a predetermined period, returns them to closed relation.

The seam-controlled mechanism will now be described according to the form illustrated. A loose free running idler drum 12 some distance back of and below the forward draft roll $h^2$ is used as a platen with which the feeler fingers are arranged in cooperative relation. Below the level of the said idler drum 12 is a transverse cylindrical rod or girt forming a tie rod between the two side frames of the shearing machine. On this girt, as best shown in Fig. 2 aided by Fig. 3, is loosely mounted a longitudinal sleeve 14 to which are secured a series of three upwardly projecting arms 14$^a$, whose upper ends are provided with aligned bearings for the support of a longitudinal rock spindle 15 on which are fastened the hubs of three parallel feeler fingers 18 formed to follow the curvature of a piece of cloth of medium thickness, that is drawn against the subtending portion of the freely rotatable drum 12. The rock shaft 15 is provided with a rearwardly extending arm 15$^a$ secured thereto and which is held under spring tension 15$^b$ to normally act, through tension on the rock shaft, to press the feeler fingers 18 simultaneously against the convex surface of the cloth travelling between the feeler fingers and the periphery of the cloth drum. Adjacent to each of these fingers are located the separate cloth-engaging rollers 16, that rotate very freely in contact with the cloth and which act as calibrating rollers so that with thicker pieces of cloth passing around the drum 12 the arms 14ᵃ will yield rearwardly just enough to keep the rollers 16 properly engaged with the cloth, according to its thickness, and maintaining the hollow curvature of the fingers as nearly as possible coinciding with the curvature of the outer surface of the thicker cloth in order that the feeler fingers 18 and their yieldable pressure arms 15ᵃ may retain substantially the same relationship to avoid rocking the spindle 15 when thicker cloth is running through the machine, while at the same time allowing the feeler fingers 18 to be rocked about their pivotal axis 15 when the seamed ends of pieces of cloth pass between the feeler fingers and the cloth guiding drum 12. Secured at the near end of the rock spindle 15, so as to project rearwardly and downwardly therefrom, is a detent or finger 19 which in the normal position of the feeler fingers engages the end portion of a finger 20 to serve as a detent to prevent the rotation of that finger 20 about its pivotal axis 21. This spindle 21 is carried in aligned bearings formed in two bearing brackets 30, that are secured in fixed position on the fixed girt 13 toward the near end of the girt and on the near end of the rockable sleeve 14. The sleeve 14 has a projecting arm 14ᵇ secured to it, which is connected by means of a tensioning spring 14ᶜ with a fixed member 13ᵃ secured to the farther end of the girt 13 so that the spring tends to rock the sleeve 14, its upwardly projecting arms 14ᵃ carrying the rock spindle 15 and thereby press the cloth engaging rollers 16 against the cloth passing around the drum 13 so as to permit the rolls to have a slight yielding movement away from the drum, according to the thickness of the interposed cloth, as above explained.

Loosely mounted on the near end of the girt 13 is a sprocket member 29, to whose near face is secured a star wheel 26 and on the near face of the star wheel is secured a series of peripheral buttons 27, which are pivotally mounted inwardly from the recesses in the star wheel and are provided on their outer faces with notches 27ᵃ. Mounted on the rock spindle 21 carried by the fixed arms 30 is a pawl 22, which carries on one side of its free end a freely rotatable roller 23 aligned to engage the projections and recesses of the star wheel when the pawl is rocked in a clockwise direction toward the star wheel, but normally held out of engagement with the star wheel by means of the stop finger 20 engaged by the tip of the detent 19.

When through the action of a passing seam the feeler member is rocked on its axis 15 to release the finger 19 from its holding engagement with the stop finger 20, the pawl is pressed inwardly toward the star wheel by the action of a contractile spring 25 which operates through a pivotally connected link 24. Now, as the star wheel is constantly rotating the pawl guiding roller may engage either a high spot or a recess on the star wheel. If it engages the former, it cannot move in until a recess of the star wheel comes into contact with it and in that latter position the tip or tooth of the pawl will engage the shoulder 27ᵃ on the adjacent button and, as the star wheel continues its revolution the button will be tipped in a clockwise direction so as to throw its forward outer corner outwardly beyond normal position. This outward movement is limited by the engagement of the inner rear corner of the button with a fixed cam ring 28, which is adjustably secured to the girt at its near end and projects inside the ring of buttons. These buttons have sufficient frictional engagement with their pivot pins or studs by which they are carried to retain them in any particular position in which they are placed until moved to another position. Consequently, a button passing by and engaged with the pawl 22 is swung to outward position by the pawl and remains there until restored to inactive position.

It is the function of each button when turned outwardly by seam-induced action of the pawl to engage a finger 31 that is adjustably secured to a rock spindle 32 carried in fixed but adjustable bearings, so as to rock said spindle in a clockwise direction and by similar movement of an arm 33 secured to said spindle and a connecting link 34 to rock another spindle 35 which carries a downwardly projecting detent 35ᵇ, which in normal position engages the end of a stop finger 36 secured to another rock spindle 37 and holds the rock spindle 37 against counter-clockwise rotation induced by the tension of a spring 38. The rock spindle 37 also carries a releasing finger 39 which, by its inward movement toward an adjacent actuating element continuously revolving in a clockwise direction, energizes that element to effect the opening of the shearing elements or the actuation of whatever seam-protecting means may be employed.

The mechanism for actuating the seam-protecting means, which in the form shown embraces the blade raising means, comprises in this instance two rotary elements interconnected by a sprocket chain but separately energized to act on different timing because of the fact that the travel of the cloth between the front draft roll and the rear shearing elements is several times longer than the travel of the cloth to the front shearing elements. Each of these elements, however, has the same construction and operates in the same way and each is under control of its individual starting elements, which are controlled by the seam-actuated feeler device.

The details of mechanism will be best understood in connection with Figs. 6 to 10, inclusive. We will first describe the forward rotary element, because the rearward element for operating the rear shearing head is similar in all respects to the other and its parts have identical reference numerals except that they are distinguished by the index letter "x". Loosely mounted on shaft 40 is a sprocket wheel 43 near whose periphery are mounted a plurality of lateral pivoted pawls 44, each of which by means of a retractile spring 45 tends normally to move on its pivot stud in a clockwise direction so as to move its front end inward when released from the control of the latch 46, also carried by the sprocket wheel, in order that the front member may engage and cause to revolve through a predetermined but variable arc of movement an arm 41 that is fast on the shaft 40, so that when the arm 41 is engaged by the front end of the pawl 44 it will revolve with the sprocket until released from the thrust of said pawl. Also fast on the shaft 40 is an arm 42 which, at its outer end, is pivotally connected with the link 7ᵇ whose other end is connected with links, previously described, to cause the raising of the front blade carrying head.

The latch 46 is normally drawn by spring tension into position to retain its associated pawl 44 out of the path of the arm 41 secured to the shaft 40, but it is released from retaining engagement with said pawl by means of the finger 39 on the rock shaft 37 which is normally kept out of the path of the outer end of the latch 46 by the same controlled detent 35$^b$ engaging and stopping movement of the arm 36, which prevents counterclockwise rotation of the rock shaft, which would result in engaging the finger 39 with the latch. As the finger is stationary and the latch is revolving with the cam when the finger 39 is moved into the path of the latch 46, the latch is disengaged against its spring tension and the associated pawl 44 is turned on its pivot stud by means of its spring 45 to form abutting contact with the arm 41, thereby rotating the shaft 40 and with it the link actuating arm 42 that opens the shearing elements for the passage of the seam.

To disengage the stop finger 39, a swell or bunt 46$^a$ carried by the sprocket wheel slightly to the rear of the latch 46 engages in its revolution the end of the stop finger 39 and cams it outwardly to inactive position, where it is engaged and held against return by means of the stop finger 35$^b$ which is ready to return to stop position immediately after it has released the finger 36 due to the action of gravity of parts or any other actuating means. The pawl, however, should be restored to inactive position as soon as it has produced the desired amount of movement of the arms 41 and 42 through which the blade head is raised. For this purpose we provide on the near end of the shaft 40 an eccentric cam 47 whose lateral hub 48 carries a projecting arm 49, whose outer end is connected by a pin 50 with a slotted arcuate link 51, which is clamped to a fixed portion of the frame in any desired position of adjustment by means of the clamping bolt 52 passing through the slot. This cam member is loose on the shaft 40 which merely acts as a support therefor and by means of the slotted link may be adjustably secured to position the swell or high part of the cam at different arcuate distances from the rear end of the arm 41, which is pushed around through engagement with one of the pawls 44. This cam is in alignment with a portion of the pawl 44, so that when the front end of the pawl rides against the periphery of the cam 47 the front end will be pushed outwardly thereby swinging inward the inner end into position to be engaged by the self-acting latch 46, which thereafter holds it at inactive position. Consequently different adjustments of the cam will permit different lengths of revolution of the arms 41 and 42 before the driving pawl is released therefrom. The longer the arc of travel produced by an engaging pawl the greater will be the opening movement of the blade raising head and the longer will be the duration of the open period. On the other hand, as soon as the actuating pawl is released there is nothing to prevent the return of the blade head either by reason of its own gravity, or a returning weight or spring. Such return, however, would result in a very objectionable jar or shock but by means of the pawl and ratchet mechanism associated with the front draft roll $h^2$, as above described, this return movement of the head is retarded or checked so that the objectionable jar or shock is eliminated, since the draft roll is positively driven at a predetermined rate of speed and by reason of the pawl and ratchet mechanism connected with the head actuating links 5 and 6 and with the connecting links 7 and 8 leading to the automatic opening mechanism, the blades return to active position only at a predetermined rate of speed, the duration of which is dependent upon the length of the arc of movement imparted to the blade actuating links and the arm that carries the pawl for engaging the ratchet on the front draft roll shaft. These links 5 and 6 are also under the control of manually operated levers 60 and the arrangement is such that whether the blades are raised or shifted by the seam-controlled mechanism, or by hand, the return of the blades to active position is always checked and controlled by the ratchet and pawl connection with the draft roll.

It will be understood, therefore, that there are two seam-controlled devices, one for the front blades and one for the rear blades embracing continuously rotating members, each energized by the feeler device to act to release their corresponding coacting blade raising elements and that these blade raising elements are continuously rotated but are energized by effective action through their respective seam-energized elements. Driving power may be imparted to the constantly rotating elements by any suitable connection with any continuously rotating shaft of the machine. In the present instance, however, we have utilized the sprocket chain $h^3$, connecting the draft roll $h$ with the front draft roll $h^2$, to rotate in a clockwise direction a pinion $h^4$ that is compounded with a sprocket engaged by said chain $h^3$, which pinion intermeshes with a pinion $h^5$ which is compounded with or united to the sprocket 29$^x$ forming part of the rear blade raising element and from which, by means of a connecting sprocket chain, the sprocket element 29 of the front raising blade control element is rotated. In like manner the rear sprocket member 43$^x$ is driven by means of a sprocket chain 63 from a rear shaft and its rotary motion is transmitted to the corresponding front element by means of a connecting sprocket chain 64.

Since the front and rear seam-energized elements are actuated through the medium of the same feeler mechanism the connecting link 24, which is attached at its forward end to the pawl 22 of the front element, is also connected at its rear end to the pawl 22$^x$ on the opposite side of the pivotal axis 21$^x$ to produce simultaneous action of the two pawls, but as it is not desired that the rear shearing elements should be separated for the passage of the seam until some time after the seam has passed the front shearing elements, but button positioning pawl 22$^x$ is located more than three-quarters of a circumference away from the arm 31$^x$, which releases for action its corresponding blade raising element for raising the rear blade. Within limits the action upon the releasing fingers 31 and 31$^x$ may be varied by adjusting those fingers circumferentially of their corresponding actuating star wheel carrying the buttons and, with this object in view, the bearing arm 65, which supports the rock shaft 32 carrying the arms 31 and 33, is made adjustable by means of a screw and slot connection with the frame to effect this adjustment in order to lengthen or shorten the interval between the action of the feeler and the energizing of the blade raising mechanism. As this adjustment may somewhat change the relative position between the finger 31 and its actuating pawl or button, the finger 31, as shown at 31$^a$, is adjustably secured by screw and slot connection to lengthen or shorten it as occasion may require to bring the tip into the proper arc of rotation of the outer corner of the actuating button.

If only a single button were used on the star wheel it might require almost an entire revolution of the button before it would be moved to active position by the pawl 22, but by using a number of buttons distributed around the periphery of the star wheel the latter needs to revolve through only a very short arc of rotation after the feeler device has been actuated by the seam in order to release and start in action the blade raising mechanism.

On a similar principle the use of a number of pawls 44 around the outer portion of the sprocket 43 serves to avoid prolonging the interval before starting to actuate the seam-protecting mechanism. Usually we prefer to use four of these pawls on the sprocket, but any convenient number may be used according to particular conditions sought for. In order to shear or crop the cloth close up to the seam, it is desirable to have a short interval elapse between the movement of the feeler device and the actual raising of the head, particularly when the cloth-seam actuates the feeler a considerable distance in its travel before reaching the shearing line and it is also desirable to be able to vary the interval between feeler movement by the seam and the actual opening of the shearing elements. The foregoing construction and arrangement fully takes care of these requirements by providing for the varying of these intervals and also provides for varying the duration of the open period of the respective shearing elements.

What we claim is:

1. In a cloth shearing machine having plural pairs of separable shearing elements, the combination with seam-protecting means associated with the shearing elements, a seam-actuated feeler device, mechanism energized through the agency of the seam-actuated device for actuating the seam-protecting means, a control mechanism intermediate the feeler means and said actuating mechanism for the protecting means, said control mechanism operating at a predetermined but variable interval after the seam has passed the feeler to thereby regulate the interval between the passing of the seam by the feeler and the movement of the seam-protecting means.

2. In a cloth shearing machine having plural pairs of separable shear elements, the combination of seam-protecting means associated with each pair of shear elements, each protecting means operable independently of the other in any desired timing sequence and each embracing individual actuating mechanism and an individual control element for such actuating mechanism, both of which are operable at any position of the seam-protecting means, and seam-actuated means for rendering operative the individual control elements.

3. In a cloth shearing machine having opposed shearing elements, the combination with seam-protecting means for protecting against injury a seam passing between the shearing elements, actuating mechanism for operating said seam-protecting means including a revoluble controller operable after a predetermined but variable interval following the travel of a seam past an associated feeler device, and a feeler device actuated by said seam to energize the controller and thereby operate the seam-protecting means.

4. In a cloth shearing machine having cloth feeding means, the combination of a seam-controlled mechanism for effecting the opening of the shearing elements of a cloth shearing machine for the passage of a seam embracing in its construction a variably timed actuating mechanism for opening said shearing elements, a feeler device arranged to be actuated by an approaching seam of the travelling cloth to energize said opening mechanism, means controlled by the cloth feeding means for retarding the return of the shearing elements to closed position.

5. Means for controlling the opening of the shearing elements of a cloth shearing machine to permit passage of an approaching seam embracing in combination with cloth feeding means shear opening means provided with an adjustment for varying, as desired, the duration of said open relationship of the shearing elements, a seam-actuated feeler for energizing such opening means, and means controlled by the cloth feeding means for checking the return to closed relation of the shearing elements.

6. In a cloth shearing machine the combination of seam-protecting means for protecting a cloth-seam against injury when passing between the shearing elements of the shearing machine continuously revolving concentric series of actuator members, a seam-actuated feeler for shifting an individual actuator to active position, said actuator when so shifted serving to effect operation of the seam-protecting means before the seam reaches the shearing elements.

7. A cloth shearing machine having separable shearing elements embracing a continuously revolving element, a plurality of concentrically arranged pivotal members carried on and revolving with said element, a seam-controlled pawl mounted outside said element for engaging and shifting to active position said pivotal members approaching it, shear opening means energized through the agency of a revolving actively positioned pivotal member to effect opening of the shearing elements for the passage of said seam, and means for returning the active pivotal member to inactive position after it has functioned.

8. A cloth shearing machine embracing in combination with seam protecting means a continuously revolving star wheel element, a series of buttons carried by said element at equal distances from its axis, an external pawl arranged to engage and shift to active position an approaching button, a detent for normally keeping said pawl out of operative position, and a feeler operable by a passing cloth-seam to release said detent for movement to active position to engage one of said buttons, means for returning said pawl to inactive position to be re-engaged by said detent after the pawl has shifted a button, and means rendered active by said button for actuating the seam-protecting means.

9. A cloth shearing machine comprising shear opening means, a continuously revolving actuating member having one or more pawls mounted on and revolving with said member, a normally stationary element loosely mounted coaxially with said revolving member and located out of the path of travel of the revolving pawl, loosely mounted element having operating connection with means for opening the shearing elements, means actuated through the agency of a seam-engaged feeler for causing the shifting of said pawl into position to engage and revolve said loosely mounted element through a predetermined arc of rotation to effect opening of the shear.

10. A cloth feeler mechanism for controlling operations of a cloth finishing machine on the cloth embracing a rockable frame located adjacent to a cloth guiding drum, arms carried by said frame, a rock spindle mounted on said arms, spaced feeler fingers mounted on said rock spindle, said fingers being formed with concave faces adapted to form contact with subtending convexly curved portions of the cloth travelling around said drum and acting, when moved away from said drum by an interposed cloth-seam, to rock said spindle and thereby energize means for the control of cloth finishing elements of the machine.

11. A feeler mechanism for a cloth finishing machine embracing a revoluble cloth guiding cylindrical drum, a rock spindle supported adjacent to said drum in parallelism with the drum axis, feeler fingers carried by said spindle to yieldingly engage the interposed portion of said cloth travelling over the periphery of the drum, said rock spindle being provided with means for effecting the energizing of mechanism for controlling the relation of cloth shearing elements to allow passage of the seam by said finishing elements without injury.

12. The combination of a revoluble cloth guiding drum, a plurality of coaxially yieldingly mounted fingers normally pressed against those portions of the travelling cloth interposed between the fingers and the drum, a yieldingly mounted support for said fingers, said support being provided with calibrating rollers for positioning the axes of the fingers nearer to or farther from the drum periphery, according to the thickness of the interposed cloth, in order to subject the fingers to the same relative movement away from normal position when a seam is interposed between the fingers and the cloth, and means actuated by the seam-induced movement of the feeler fingers for energizing driven mechanism for shifting cloth finishing members to inactive relation to permit passage by them of the seam.

13. In an automatically controlled cloth shearing machine including cloth feeding means, the combination with means for opening and for closing the shearing elements at predetermined but variable intervals between the opening and the closing of the shearing elements, a feeler device for energizing the opening mechanism a predetermined period after a seam passes the feeler, both the opening and the closing movements being under control of the cloth feeding means.

14. A seam-actuated feeler mechanism for controlling the operation of means for protecting the seam against injury by cloth finishing elements embracing in combination one or more pivotal feelers yieldable about a pivotal axis when engaged by a passing seam, and calibrating means arranged to adjust each feeler according to the thickness of the passing cloth.

15. In a cloth shearing machine having separable shearing elements the combination with seam-protecting means for permitting safe passage of a seam between the shearing elements, of continuously running actuating mechanism therefor, a seam energized feeler device, a continuously running control mechanism rendered operative by the movement of the feeler to energize the seam-protecting actuating mechanism each time the feeler is energized by the passing cloth.

16. In a cloth shearing machine the combination with plural sets of successively acting separable shearing elements, of seam-protecting means for separating the elements of each shearing set, an actuating mechanism for each seam-protecting means, a seam actuated feeler, and means energized through the agency of said feeler to cause successive operation of each actuating mechanism on its associated seam-protecting means in a predetermined timed sequence.

17. In a cloth shearing machine the combination with a plurality of separable shearing elements, seam-protecting means for successively separating said elements to permit safe passage of an approaching seam, a seam energized feeler, and means set in operation through the seam-induced movement of said feeler to cause successive operation of the respective seam-protecting means in a predetermined timed sequence.

18. In a cloth shearing machine the combination with separable shearing elements, of seam-protecting means for opening the shearing elements for safe passage of the seam, a plurality of continuously revolving actuating members, each of which is shiftable from inactive to active position for operating the seam-protecting means to open the shearing elements, and a seam energized feeler for causing the shifting of one of said actuating members to operative position each time that the feeler is energized.

CHARLES G. RICHARDSON.
JOHN W. HOGUE.